(12) United States Patent
Liu et al.

(10) Patent No.: US 9,582,388 B2
(45) Date of Patent: Feb. 28, 2017

(54) DYNAMIC MULTI-PURPOSE EXTERNAL ACCESS POINTS CONNECTED TO CORE INTERFACES WITHIN A SYSTEM ON CHIP (SOC)

(71) Applicant: GLOBALFOUNDRIES Inc., Grand Cayman (KY)

(72) Inventors: Zhi G. Liu, Shanghai (CN); Megan P. Nguyen, Austing, TX (US); Bill N. On, Austin, TX (US); Suksoon Yong, Austin, TX (US)

(73) Assignee: GlobalFoundries Inc., Grand Cayman (KY)

( * ) Notice: Subject to any disclaimer, the term of this patent is extended or adjusted under 35 U.S.C. 154(b) by 224 days.

(21) Appl. No.: 14/506,331

(22) Filed: Oct. 3, 2014

(65) Prior Publication Data
US 2016/0098332 A1 Apr. 7, 2016

(51) Int. Cl.
*G06F 11/36* (2006.01)
*G06F 11/22* (2006.01)
*G06F 13/40* (2006.01)

(52) U.S. Cl.
CPC ........ *G06F 11/221* (2013.01); *G06F 13/4022* (2013.01)

(58) Field of Classification Search
USPC .................................. 714/11, 25; 710/26, 62
See application file for complete search history.

(56) References Cited

U.S. PATENT DOCUMENTS

| | | | | |
|---|---|---|---|---|
| 6,115,763 | A * | 9/2000 | Douskey | G06F 11/267 710/20 |
| 6,343,358 | B1 * | 1/2002 | Jaggar | G01R 31/31855 712/227 |
| 6,385,749 | B1 | 5/2002 | Adusumilli et al. | |
| 6,861,866 | B2 * | 3/2005 | Han | G01R 31/31705 326/16 |

(Continued)

OTHER PUBLICATIONS

Koch et al, "An Adaptive System-on-Chip for Network Applications", accessed online from <a. http://www.cecs.uci.edu/~papers/ipdps06/pdfs/112-RAW-paper-1.pdf> as of Apr. 8, 2014, 8 pages.

(Continued)

*Primary Examiner* — Kamini Patel
(74) *Attorney, Agent, or Firm* — DeLio, Peterson & Curcio, LLC; Robert Curcio

(57) ABSTRACT

An integrated circuit device comprises multiple cores each comprising one or more separate input and output interfaces, the multiple cores integrated within the integrated circuit device to function as a single computer system. Internal inter-chip connection links are disposed on the integrated circuit device for connecting one or more cores with at least one other core via the one or more separate input and output interfaces. One or more bidirectional access ports are communicatively connected in each path of the inter-chip connection links to enable a separate external access point to each of the one or more separate input and output interfaces of the cores, wherein each of the one or more bidirectional access ports is dynamically selectable as each of an external input interface of the integrated circuit device and an external output interface of the integrated circuit device.

16 Claims, 5 Drawing Sheets

(56) References Cited

U.S. PATENT DOCUMENTS

| | | | | |
|---|---|---|---|---|
| 7,080,283 | B1* | 7/2006 | Songer | G06F 11/3636 714/30 |
| 7,219,265 | B2* | 5/2007 | Yee | G06F 11/267 714/30 |
| 7,555,422 | B2* | 6/2009 | Newman | G06F 11/261 703/23 |
| 7,650,545 | B1 | 1/2010 | Abramovici et al. | |
| 8,074,110 | B2 | 12/2011 | Vera et al. | |
| 8,103,497 | B1* | 1/2012 | Nemecek | G06F 11/261 703/14 |
| 8,782,468 | B2* | 7/2014 | Bhattacharyya | G06F 11/2242 714/30 |
| 2001/0039633 | A1* | 11/2001 | Swoboda | G01R 31/31705 714/28 |
| 2006/0224826 | A1* | 10/2006 | Arai | G06F 3/061 711/114 |
| 2006/0248395 | A1* | 11/2006 | McGowan | G06F 11/2236 714/30 |
| 2013/0031418 | A1* | 1/2013 | Bellofatto | G06F 11/2242 714/40 |
| 2013/0090887 | A1* | 4/2013 | Deogharia | G01R 31/31855 702/120 |
| 2013/0238933 | A1* | 9/2013 | Shin | G06F 11/27 714/30 |
| 2013/0318403 | A1* | 11/2013 | Kim | G06F 11/3656 714/38.1 |
| 2013/0339790 | A1* | 12/2013 | Menon | G06F 11/27 714/30 |
| 2014/0208165 | A1* | 7/2014 | Kang | G06F 11/267 714/37 |
| 2014/0372610 | A1* | 12/2014 | Cao | H04L 67/34 709/225 |
| 2015/0269054 | A1* | 9/2015 | Kothamasu | G06F 11/3476 714/45 |

OTHER PUBLICATIONS

Aggarwal et al, "Configurable Isolation: Building High Availability Systems with Commodity Mult-core Processors", ISCA 2007, San Diego, CA, USA, 2007, 12 pages.

Youssef et al, "Debugging HW/SW Interface for MPSoC: Video Encoder System Design Case Study", available online from <http://citeseerxist.psu.edu/viewdoc/download?doi=10.1.1.386.9265&rep=rep1&1type=pdf> as of Apr. 8, 2014, pp. 908-913, 6 pages.

Wolf et al, "Multiprocessor System-on-Chip (MPSoC) Technology", IEEE Transactions on Computer-Aided Design of Integrated Circuits and Systems, vol. 27, No. 10, Oct. 2008, available online from < http://www.cs.unc.edu/~montek/teaching/Comp790-Fall11/Home/Home_files/2008Wolf.pdf> as Apr. 8, 2014, 13 pages.

Petkov et al, "Hardware Prototyping of ARM Based System on Chip", Electronics, 2005, available online from <http://www.researchgate.net publication/228410726_HARDWARE_PROTOTYPING_OF_ARM_$_M$BASED_SYSTEM_ON_CHIP> as of Apr. 8, 2014, 7 pages.

Collin et al, "SoCrates—A Scalable Multiprocessor System on Chip", Department of Computer Engineering, available online from <http://www.mrtc.mdh.se/socrates/TR0099.pdf> as of Apr. 8, 2014, 180 pages.

Torres et al., "An Introduction to Multi-Core System on Chip—Trends and challenges", Nov. 9, 2010, University of Motpeellier, France, 23 pages.

Peh et al, "On-Chip Networks for Multicore Systems", Chapter 2, Systems, DOI, 2009, pp. 35-71, 38 pages.

Kumar et al., "Interconnections in Multi-core Architectures: Understanding Mechanisms, Overheads, and Scaling", IEEE, 2005, 12 pages.

Anderson, Thomas, "System-on-Chip Design with Virtual Components", Circuit Cellar, Issue 109, Aug. 1999, 8 pages.

Zorian, et al, "System-on-Chip Test: Methodology and Experience", accessed online from <http://grouper.ieee.org/groups/1500/itc981soc_test_methodology.pdf> on Apr. 8, 2014, 73 pages.

* cited by examiner

DYNAMIC MULTI-PURPOSE EXTERNAL ACCESS POINTS CONNECTED TO CORE INTERFACES WITHIN A SYSTEM ON CHIP (SOC)

TECHNICAL FIELD

The embodiment of the invention relates generally to a system on chip (SOC) and particularly to specifying dynamic multi-purpose external access points connected to input/output (I/O) interfaces of cores connected within a SOC to provide for debugging cores and replacement of failed internal cores by one or more external cores.

DESCRIPTION OF THE RELATED ART

A system on chip (SOC) is an integrated circuit that integrates the components of a computer system or electronic system into a single integrated circuit, or chip. A SOC often integrates multiple functional cores, such as processor cores. The functional cores often include individual, stand-alone cores that are fully functional independent of the SOC, but may be integrated into a SOC design and manufactured within a SOC to function with other functional cores as a computer system on a single chip.

BRIEF SUMMARY

Individual cores may each include one or more I/O interfaces that each provide an observation point for use in debugging the individual core. At the observation point, the signals from the I/O interface are highly visible when each of the individual cores is manufactured as an individual, stand-alone processor core. When these individual processor cores are integrated into a SOC, as internal functional cores of the SOC, one or more I/O interfaces of each core that were previously accessible as observation points for debugging, are no longer accessible as observation points. In view of the foregoing, there is a need for a method, system, and computer program product for specifying dynamic multi-purpose external access points connected to the one or more I/O interfaces of the internal cores of an SOC, where each dynamic multi-purpose external access point provides an observation point for debugging one or more cores within the SOC and provides an I/O interface connection point for enabling replacement of failed cores within the SOC by external cores.

In one embodiment, a system is directed to an integrated circuit device. The integrated circuit device comprising cores disposed on an integrated circuit device, one or more of the cores comprising one or more separate input and output interfaces, each of the cores integrated within the integrated circuit device to function as a single computer system. The integrated circuit device comprising one or more internal inter-chip connection links disposed on the integrated circuit device for connecting one or more of the cores with at least one other core via the one or more separate input and output interfaces. The integrated circuit device comprising one or more bidirectional access ports communicatively connected in each path of the one or more inter-chip connection links to enable a separate external access point to each of the one or more separate input and output interfaces of the one or more cores, wherein each of the one or more bidirectional access ports is dynamically selectable as each of an external input interface and an external output interface.

In another embodiment, a method for designing a system on chip is directed to, in response to detecting an IP block placed in a design for a system on chip and an input and output interface of the IP block inter-connected with at least one other input and output interface of another IP block through an inter-chip communication link, setting a particular bit for the inter-chip communication link in a control bit register comprising multiple bits. The method is directed to specifying an external access point for the inter-chip communication link in the design. The method is directed to inserting a bidirectional access port selectable according to the particular bit of the control bit register into the inter-chip communication link in the design, wherein the bidirectional access port is dynamically selectable as each of an input interface and an output interface by according to the setting in the particular bit. The method is directed to setting the access port to the external access point for an external access to the IP block within the design for the system on chip for providing an external access to the input and output interface of a core manufactured in the system on chip for the IP block in the design.

In another embodiment, a method for testing each individual core of a plurality of cores integrated into an integrated circuit device directed to setting, by a debugging controller, bidirectional access ports within an integrated circuit device, each of the bidirectional access ports connected to a separate external access point of multiple external access points of the integrated circuit device, to enable each of the bidirectional access ports to operate as an external output port for outputting a separate signal from a separate output interface of one of multiple cores integrated within the integrated circuit device onto a separate external access point of the multiple external access points. The method is directed to running, by a debugging controller, a test sequence on the integrated circuit device. The method is directed to analyzing, by the debugging controller the outputs read from the plurality of external access points to determine whether each core of the multiple cores is functional. The method is directed to, in response to detecting from the outputs read from the external access points that a particular core of the multiple cores has failed, selecting, by the debugging controller, a first selection of the bidirectional access ports to set to operate as an external input port for receiving signals from an output interface of an external core and selecting a second selection of the plurality of bidirectional access ports to set to operate as an external output port for signals output from at least one of the cores to enable replacement of the particular core within the integrated circuit device by the external core.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
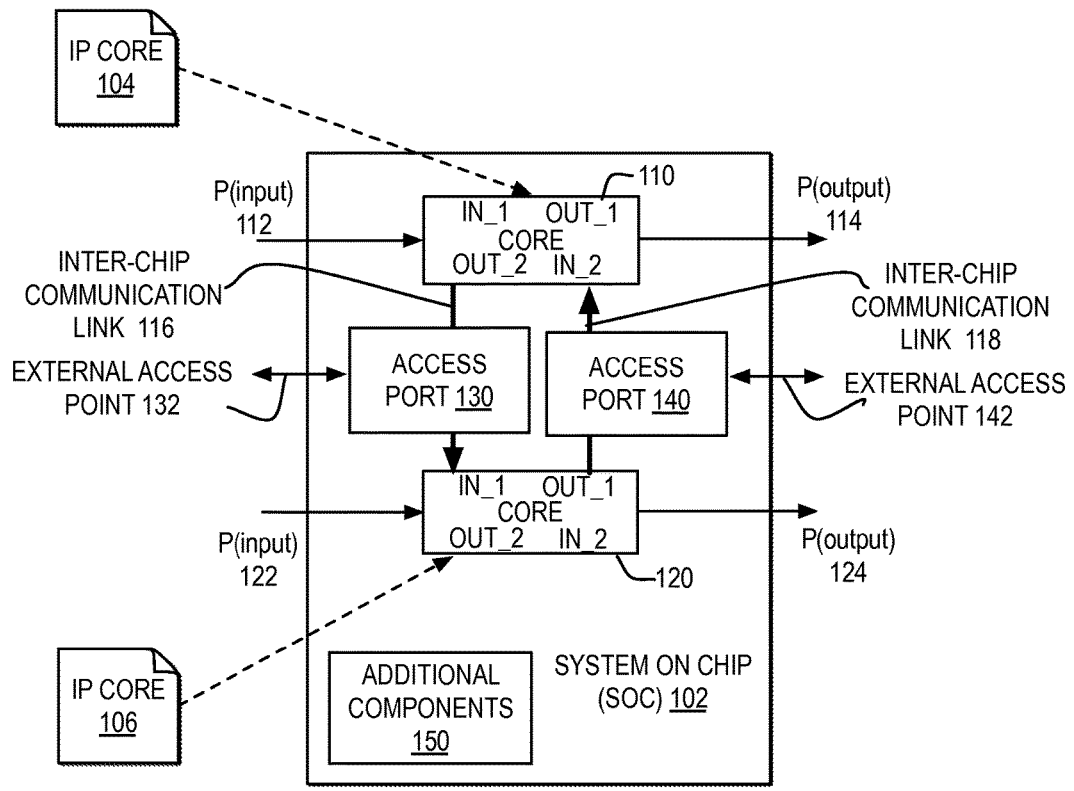
FIG. 1 illustrates one example of a block diagram of a system on chip (SOC) integrating multiple cores with bidirectional access ports integrated into inter-core communication links to provide dynamic multi-purpose external access points for debugging individual cores and for enabling replacement of failed cores within the system on chip with one or more external replacement cores.

FIG. 1 illustrates a block diagram of a system on chip (SOC) integrating multiple cores with bidirectional access ports integrated into inter-core communication links to provide dynamic multi-purpose external access points for debugging individual cores and for enabling replacement of failed cores within the system on chip with one or more external replacement cores.

In one example, a system on chip (SOC) 102 represents an integrated circuit that includes one or more functional cores, such as a core 110 and a core 120, along with additional components 150 of a computer system, integrated on a single chip and functional together as a computer system. In one example, each of core 110 and core 120 represent one or more of a processor core, a memory core, or other type of functional cores. Additional examples of functional cores may include, but are not limited to, digital signal processor (DSP) cores, multimedia processor cores, and communication protocol processing engines. The one or more cores on SOC 102 may include homogenous cores and heterogeneous cores. Additional components 150 may include, but are not limited to, additional processor cores, memory cores, interface units, analog control units and interfaces, voltage regulators, power management circuits, one or more buses running between one or more of the elements on SOC 102, and bus control units.

In one example, during the design process for SOC 102, one or more intellectual property (IP) cores may be placed by a designer into the design for SOC 102. In one example, each IP core represents an integrated circuit block that is designed and verified by one or more parties and enabled for integration into the design of an SOC. The IP cores may represent functional core designs that are pre-designed and pre-verified for reuse across multiple SOC designs. In another example, IP cores, may represent functional core designs that are designed specifically for SOC 102. The IP cores may include designs for multiple types of functional cores including, but not limited to, processors, memory blocks, interface blocks, analog blocks, and component that handle application specific processing functions.

In one example, an IP core 104 represents the IP core design block integrated into SOC 102 for core 110 and an IP core 106 represents the IP core design block integrated into SOC 102 for core 120. IP core 104 and IP core 106 may represent a same design block or different design blocks and may be designed or provided by a same entity or different entity. In another example, IP core 104 or IP core 106 may each be manufactured as individual chips by one party and then integrated into the design of SOC 102 and manufactured within SOC 102. One of ordinary skill in the art will appreciate that SOC 102 may be designed with additional or alternate IP cores and that all of SOC 102 may be manufactured during a single process or that parts of SOC 102 may be manufactured in one or more initial design and manufacture processes and then integrated into other parts of SOC 102 during one or more additional design and manufacture processes.

In one example, IP core 104 and IP core 106 each represent a processor core design with multiple input interfaces and multiple output interfaces. For example, each of IP core 104 and IP core 106 may include a processor core design including one or more primary (P) input interfaces and one or more primary (P) output interfaces. In addition, in one example, one or more of the input and output interfaces for IP core 104 and IP core 106 may enable debugging the operational functionality of each core and may also provide interfaces through which one or more cores may communicate with one another. For example, each of IP core 104 and IP core 106 may include one or more additional interfaces for input labeled, for example, as IN_1 and IN_2, and one or more additional interfaces for output labeled, for example, as OUT_1 and OUT_2. In additional or alternate embodiments, IP core 104 and IP core 106 may include additional input and output interfaces.

Figure 2:
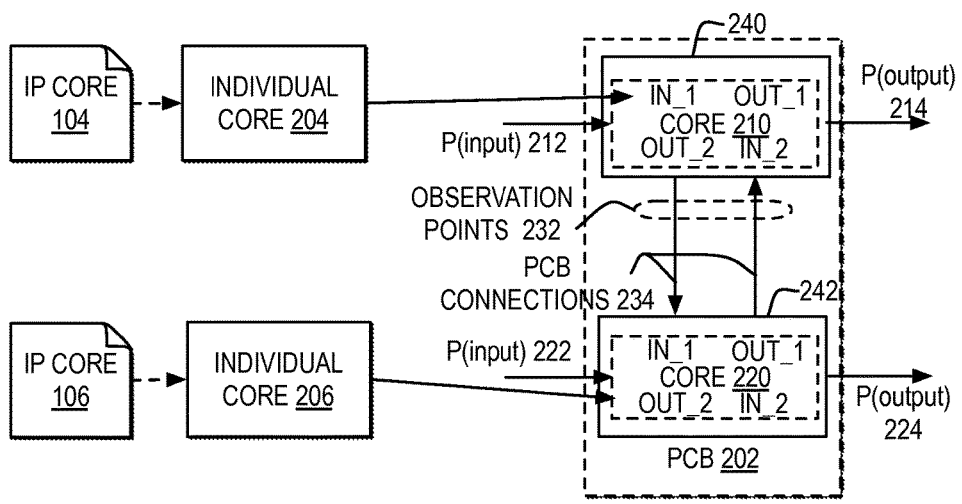
FIG. 2 illustrates one example of a block diagram of stand-alone, individual processor cores attached to a PCB.

In one example, while the IP cores for each of core 110 and core 120 may be integrated into SOC 102 for manufacture within a single chip, in another example, the IP cores for each of core 110 and core 120 may also be manufactured as stand-alone, individual cores. For example, FIG. 2 illustrates stand-alone, individual processor cores attached to a PCB. In particular, in the example, the design block for IP core 104 may be manufactured as an individual core 204, which is a stand-alone, individual processor core, and the design block for IP core 106 may be manufactured as an individual core 206, which is also a stand-alone, individual processor core. In one example, stand-along individual processor cores, such as individual core 204 and individual core 206 may be connected to one another by being attached in a multichip board, such as a printed circuit board (PCB) 202. In one example, individual core 204 is attached to a pad 240 of PCB 202, illustrated as core 210 when attached, and individual core 206 is attached to a pad 242, illustrated as core 220 when attached. In one example, PCB 202, or other similar substrate for supporting circuit elements, may include mechanical supports and electrical connections for connecting one or more elements. In one example, PCB 202 may implement electrical connections through conductive tracks, pads, and other elements laid out and etched into metal sheets laminated onto a non-conductive substrate. In one example, PCB 202 includes PCB connections 234, which are electrical connections of PCB 202 connecting pad 240 and pad 242, and includes electrical connections to pad 240 and pad 242 for paths of primary inputs and primary outputs for the cores attached to each pad. For example, PCB 202 may include electrical connections for a P(input) 212 into pad 240 and a P(output) 214 from pad 240 and for a P(input) 222 into pad 242 and a P(output) 224 from pad 242. In one example, core 210 and core 220 can be removed from pad 240 and pad 242, respectively, and interchanged with another core attached to each of pad 240 and pad 242, respectively, if one of core 210 or core 220, fails. As described herein, a stand-alone or individual core refers to a core that independently may be fully functional as a processor core or other logic core, and may also be connected to one or more other cores in one or more types of systems.

In one example, when IP core 104 and IP core 106 are integrated into SOC 102, the SOC design may optimize the integration and connections between the IP cores, to enable more efficient implementation of complex functions when IP core 104 and IP core 106 are integrated onto a single chip than may be achieved if IP core 104 and IP core 106 are manufactured as individual cores and connected together in PCB 202. While integrating IP core 104 and IP core 106 into SOC 102 may enable more efficient implementation of complex functions, when IP core 104 and IP core 106 are integrated into SOC 102, the additional input and output interfaces that may enable debugging of individual cores within SOC 102, such as IN_1, IN_2, OUT_1, and OUT_2, become internal signals within SOC 102 and may no longer be visible to components external to SOC 102 without additional alternate data paths to external interfaces of SOC 102 integrated into the design of SOC 102. In contrast, when IP core 104 and IP core 106 are each manufactured into individual core 204 and individual core 206, respectively, and then attached to PCB 202, the input and output interfaces that enable debugging of core 210 and core 220, such as IN_1, IN_2, OUT_1, and OUT_2, remain visible for debugging for elements external to PCB 202 through one or more observation points 232 at each core interface or where PCB connections 234 may be visible within PCB 202. In particular, access to the input and output interfaces of core 210 and core 220 allows for debugging each core individually. There is a need to access these input and output interfaces of cores for debugging each core individually when cores are integrated into SOC 102.

In one example, as integrated into SOC 102, SOC 102 may include one or more external pins or other external interfaces specified on the single chip that are a direct data path to one or more of the input interfaces and output interfaces of the cores integrated into SOC 102. For example, each of core 110 and core 120 may include one or more input interfaces for receiving a primary input, labeled as P(input) 112 to core 110 and P(input) 122 to core 120. In addition, each of core 110 and core 120 include one or more output interfaces for outputting a primary output, labeled as P(output) 114 from core 110 and P(output) 124 from core 120. In one example, SOC 102 may be specified one or more external pins of the chip dedicated to enabling external access to each of P(input) 112, P(output) 114, P(input) 122, and P(output) 124. In one example, each of P(input) 112, P(output) 114, P(input) 122, and P(output) 124, may connect through one or more buses specified for primary inputs and outputs, which connects to an external interface of SOC 102 specified for inputs and outputs to a main system bus external to SOC 102.

In addition, as integrated into SOC 102, SOC 102 may include one or more internal, inter-chip communication links for passing internal signals for connecting input interfaces and output interfaces of the cores integrated within SOC 102. In one example, the inter-chip communication links may connect through a selection of busses specified for service inputs and outputs within SOC 102. In one example, each of core 110 and core 120 may include one or more additional input and output interfaces that enable cores to communicate with other cores or other cores or other elements. For example, each of core 110 and core 120 include additional input interfaces IN_1 and IN_2 and additional output interfaces OUT_1 and OUT_2. In one example, within SOC 102, the signals of the additional input and output interfaces of each core may be directed to another core through one or more inter-chip communication links for passing internal signals integrated into SOC chip 102. In one example, an inter-chip communication link 116 connects the output signal from OUT_2 of core 110 to the input signal of IN_1 of core 120 and an inter-chip communication link 118 connects the output signal from OUT_1 of core 120 to the input signal of IN_2 of core 110. In one example, core 110 and core 120 represent one selection of cores connected within SOC 102. In additional or alternate embodiments, additional cores may be integrated into SOC 102 and each core may be connected with one or more additional cores.

In one example, the internal signals, as passed between core 110 and core 120 via inter-chip communication link 116 and inter-chip communication link 118, may not be visible to components external to SOC 102 because the inter-chip communication links may be hidden within SOC 102 when manufactured. While IP core 104 and IP core 106 may be individually pre-designed and pre-verified, when IP core 104 and IP core 106 are integrated into SOC 102 and manufactured as internal cores, there may be a need to individually debug each core during prototyping and after manufacture in order to identify a failed core. Without access to the signals of the additional input and output interfaces of each internal core, it may be difficult to identify the root cause of hardware or software bugs to enable bugs to be analyzed and fixed.

In the example, to enable debugging of individual internal cores integrated within an SOC, SOC 102 includes an access port integrated into each inter-chip communication link to provide a dynamic, multi-purpose external access point into the additional input and output interfaces of each core integrated into SOC 102, to enable visibility into the functionality of each of core 110 and core 120 and to enable replacement of each of core 110 and core 120. In particular, in the example, SOC 102 includes an access port 130 integrated into inter-chip communication link 116 to provide a bidirectional external access point 132 via an external interface pin of SOC 102 to the signal passed through inter-chip communication link 116 from OUT_2 of core 110 to IN_1 of 120. In the example, SOC 102 includes an access port 140 integrated into inter-chip communication link 118 to provide a bidirectional external access point 142 via an external interface pin of SOC 102 to the signal passed through inter-chip communication link 118 from OUT_1 of core 120 to IN_2 of core 110. In another example, access port 130 and access port 140 may only provide a single direction access point into each of the inter-chip communication links.

In one example, each external access point for each access port, such as external access point 132 and external access point 142, may be wired through a bus to a separate external pin of SOC 102, such that a separate external pin is set aside for each access port. In one example, a particular external interface of SOC 102 may be specified for external pins designated as access ports. In another example, one or more external access points for one or more access ports may share an external pin or other external interface, where additional logic is added to dynamically select an access port to associate with the external pin or other external interface.

In one example, while integrating IP core 104 and IP core 106 into SOC 102 may enable integration of the cores for efficient handling of complex functions, once IP core 104 and IP core 106 are manufactured as core 110 and core 120 within SOC 102, core 110 and core 120 may be fixed within SOC 102 and not interchangeable. For example, core 110 may be integrated as an internal core of SOC 102 in a manner such that if core 110 fails, core 110 cannot be physically removed from a space within SOC 102 and replaced by another core in the space within SOC 102. In contrast, when IP core 104 and IP core 106 are individually manufactured and then attached to PCB 202, while IP core 104 and IP core 106 may remain interchangeable, the individual cores temporarily connected via PCB 202 may not implement complex functions as efficiently as the same IP cores integrated into SOC 102.

In particular, when IP core 104 and IP core 106 are manufactured as internal cores integrated within SOC 102, SOC 102 may also require that all cores integrated within SOC 102 are functioning for SOC 102 to function, such that even if only one core within SOC 102 fails, the entire chip is rendered inoperable or inefficient. In one example, SOC 102 may also include on-demand or backup cores, which represent cores integrated into the SOC during manufacturing, but only activated to replace a primary core if a primary core fails, to ensure that the SOC may continue to operate even if a primary core fails. While integrating on-demand or backup cores into SOC 102 as a backup for a failed core does provides one way to correct for a failed core within SOC 102, on-demand or backup cores require additional space and infrastructure on SOC 102 and increase the cost of manufacture of SOC 102.

In the example, in addition to setting aside external pins of SOC 102 for providing external access points into the signals of the additional input interfaces and output interfaces passed between the inter-chip communication links, the logic of each access port may be dynamically configured both to read signals for debugging of individual cores within SOC 102 and to enable replacement of individual cores within SOC 102 by one or more external cores. In the example, each of access port 130 and access port 140 may be dynamically configured to send the output signal of a core to an external access point or to receive an input from an external replacement core and place the received input as an input signal to a core. The output signal of a core may be read by a service processor or other debugging component or may be read by an external processor replacing an internal core. The input signal to a core may be output by an external processor replacing an internal core. For example, access port 130 may be dynamically configured to send the output signal from OUT_2 of core 110 as an output to external access point 132 and via inter-chip communication link 116 as an input to IN_1 of core 120 or access port 130 may be dynamically configured to receive an input signal via external access point 132 and pass the input signal from external access point 132 to IN_1 of core 120 via inter-chip communication link 116. In addition, for example, access port 140 may be dynamically configured to send the output signal from OUT_1 of core 120 as an output to external access point 142 and via inter-chip communication link 118 as an input to IN_2 of core 110 or access port 140 may be dynamically configured to receive an input signal via external access point 142 and pass the input signal from external access point 142 to IN_2 of core 110 via inter-chip communication link 118. In the example, each of access port 130 and access port 140 may be dynamically configured as each of an input interface and output interface to external access point 132 and external access point 142, respectively, where each access port is dynamically selectable as each of an input interface and an output interface to an external access point based on a current control bit setting received as an input to each access port. In one example, a separate control bit for each access port may be set within SOC 102, where the control bit setting specifies whether the access port operates as an input port or whether the access port operates as and output port. In additional or alternate examples, each access port may include one or more other types of interfaces through which each access port is dynamically selectable as an input port or an output port to an external access point.

Figure 3:
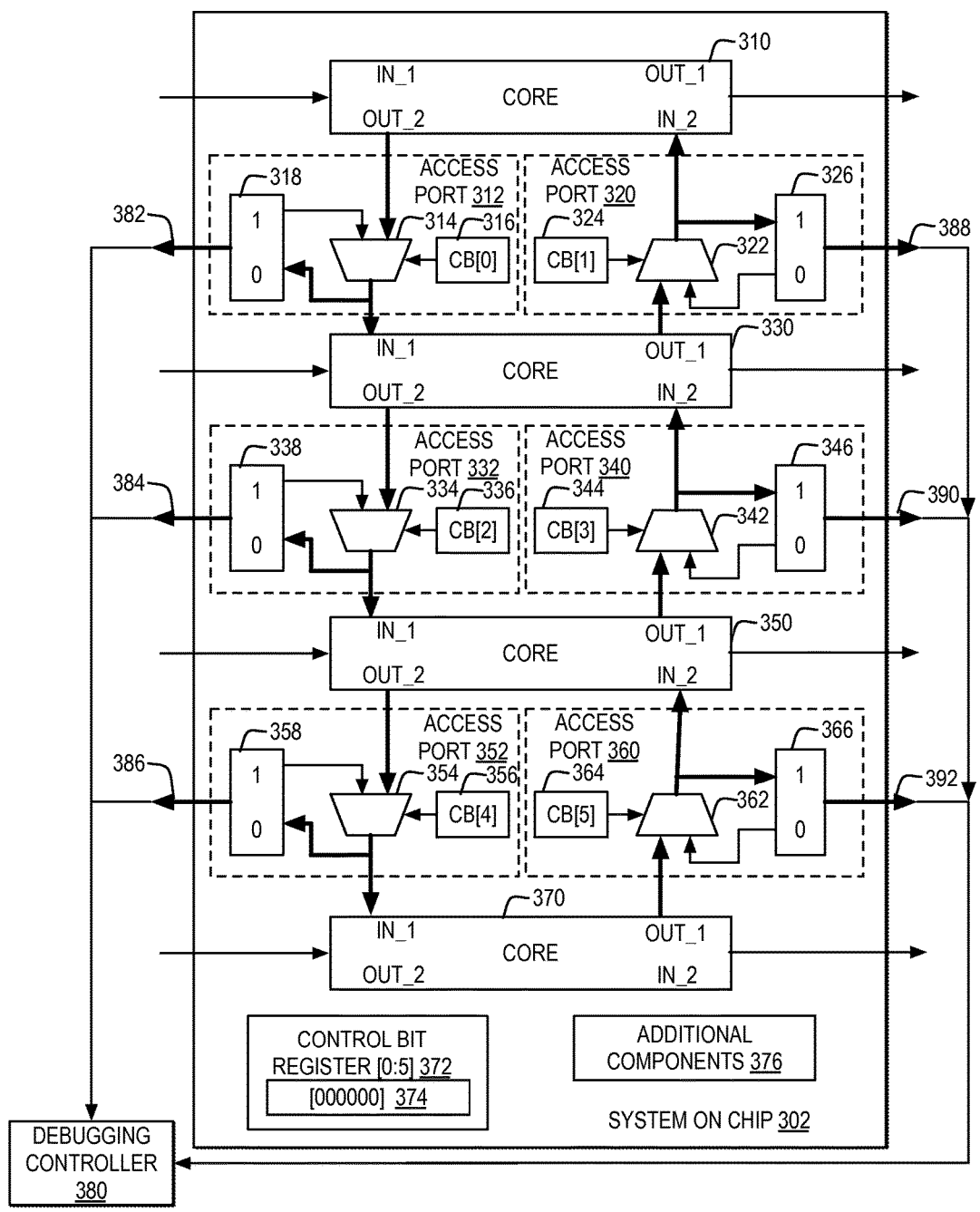
FIG. 3 illustrates one example of a block diagram of an SOC with access ports providing dynamic multi-purpose external access points that are dynamically set for debugging internal signal I/O interfaces of the SOC.

FIG. 3 illustrates one example of a block diagram of an SOC with access ports providing dynamic multi-purpose external access points that are dynamically set for debugging internal signal I/O interfaces of the SOC.

In one example, a core 310, a core 330, a core 350, and a core 370 are integrated into an SOC 302, along with additional components 376, to function as a computer system on a single chip. In one example, an access port is integrated into each of the inter-chip communication links between the additional input and output interfaces of core 310 and core 330, between the additional input and output interfaces of core 330 and core 350, and between the additional input and output interfaces of core 350 and core 370. For example, an access port 312 is integrated into the inter-chip communication link between OUT_2 of core 310 and IN_1 of core 330 and an access port 320 is integrated into the inter-chip communication link between OUT_1 of core 330 and IN_2 of core 310. For example, an access port 332 is integrated into the inter-chip communication link between OUT_2 of core 330 and IN_1 of core 350 and an access port 340 is integrated into the inter-chip communication link between OUT_1 of core 350 and IN_2 of core 330. For example, an access port 352 is integrated into the inter-chip communication link between OUT_2 of core 350 and IN_1 of core 370 and an access port 360 is integrated into the inter-chip communication link between OUT_1 of core 370 and IN_2 of core 350.

In one example, SOC 302 may also include a control bit register 372 that includes a separate bit setting for selecting one or more dynamically selectable settings within an access port. For example, SOC 302 is illustrated with six access ports and control bit register 372 may include six bit settings, where each bit setting dynamically selects one or ore dynamic settings within a particular access port. In one example, a bit "0" in control bit register 372 sets CB[0] 316 within access port 312, a bit "1" in control bit register 372 sets CB[1] 324 within access port 320, a bit "2" in control bit register 372 sets CB[2] 336 in access port 332, a bit "3" in control bit register 372 sets CB[3] 344 in access port 340, a bit "4" in control bit register 372 sets CB[4] 356 in access port 352, and a bit "5" in control bit register 372 sets CB[5] 364 in access port 360.

In one example, based on the current values of dynamically selectable selections of bits within control bit register 372, each access port is selected as either an output port for enabling debugging of a core by a debugging controller, such as debugging controller 380, or as an input port for enabling replacement of an internal core of SOC 302 by an external core. In one example, if the control register bit for an access port is set to "0", then the access port is selected for enabling debugging of the core by a debugging controller, and if an access port is set to "1", then the access port is selected for enabling replacement of an internal core by an external core.

In one example, each access port may include logical elements that are dynamically selectable for selecting whether the connection between the access port and an external access point of SOC 302 should function as an input port or as an output port. In one example, each access port may include a bidirectional I/O port connected to an external pin or other external interface of SOC 312. In one example, each bidirectional I/O port is dynamically selectable as an input port, set to switch "1", or as an output port, set to switch "0", based on a current selection of the control bit associated with each bidirectional I/O port within control bit register 372. For example, access port 312 includes a bidirectional I/O port 318 connected to an external access point 382, access port 320 includes a bidirectional I/O port 326 connected to an external access point 388, access port 332 includes a bidirectional I/O port 338 connected to an external access point 384, access port 340 includes a bidirectional I/O port 346 connected to an external access point 390, access port 352 includes a bidirectional I/O port 358 connected to an external access point 386, and access port 360 includes a bidirectional I/O port 366 connected to an external access point 392. In one example, external access point 382, external access point 384, external access point 386, external access point 388, external access point 390, external access point 392, as implemented, may include connections through one or more busses connected to an external interface of SOC 302. In additional or alternate embodiments, additional or alternate logical elements may be implemented to select whether a connection between the access port an external access point of SOC 302 should function as an input port or as an output port.

In one example, each access port may also include logical elements that are dynamically selectable for selecting the signal to output from the access port to an input port of an internal core of SOC 302. In one example, each access port includes a multiplexor that selects the signal to output from each access port from among multiple inputs to the access port, based on a current selection of the control bit associated with each bidirectional I/O port within control bit register 372. In one example, the inputs to the access port include a signal output from an output interface of an internal core of SOC 302, selected when a control bit for the access port is set to "0", and a signal received from an external core via a bidirectional I/O port, selected when the control bit for the access port is set to "1". For example, access port 312 includes a multiplexor 314 for receiving inputs from OUT_2 of core 310 and bidirectional I/O port 318 and selecting an output to IN_1 of core 330, access port 320 includes a multiplexor 322 for receiving inputs from OUT_1 or core 330 and bidirectional I/O port 326 and selecting an output to IN_2 of core 310, access port 332 includes a multiplexor 334 for receiving inputs from OUT_2 of core 330 and bidirectional I/O port 338 and selecting an output to IN_1 of core 350, access port 340 includes a multiplexor 342 for receiving inputs from OUT_1 or core 350 and bidirectional I/O port 346 and selecting an output to IN_2 of core 330, access port 352 includes a multiplexor 354 for receiving inputs from OUT_2 of core 350 and bidirectional I/O port 358 and selecting an output to IN_1 of core 370, and access port 360 includes a multiplexor 362 for receiving inputs from OUT_1 or core 370 and bidirectional I/O port 366 and selecting an output to IN_2 of core 350. In additional or alternate embodiments, additional or alternate logical elements may be implemented to select the signal to output from the access port to an input port of an internal core of SOC 302.

In one example, as illustrated in FIG. 3, as illustrated at reference numeral 374, a current control bit setting in control bit register 372 is "000000". The current control bit setting of "000000" dynamically sets each access port within SOC 302 to operate for debugging. In one example, debugging controller 380 is configured to read the output of the external pins associated with each of the access ports, to enabling debugging of each of core 310, core 330, core 350, and core 370, individually. In addition, debugging controller 380 may send one or more inputs to SOC 302 to trigger each core to function so that the outputs from each core can be read and analyzed to determine the operational functionality of each individual core. For example, debugging controller 380 may send inputs to the P input of one or more of core 310, core 330, core 350, and core 370 of SOC 302 and read the P output of one or more of each of core 310, core 330, core 350, and core 370. In another example, debugging controller 380 may send one or more inputs to one or more debugging elements integrated into SOC 302. Debugging elements integrated into SOC 302 may include a global debugging controller integrated into SOC 302 for controlling testing on each element of SOC 302 and may include or more individual debugging controllers, such as LBIST controllers, integrated within one or more cores.

In particular, in the example, based on the current control bit setting of "000000" in control big register 372, as illustrated at reference numeral 374, each access port within SOC 302 is set to operate for debugging by setting the multiplexor output in each access port to output the signal output by the output interface of an internal core, to the input interface of another internal core, and by setting each bidirectional I/O port to output the signal output by the output interface, to an external access point. In one example, the signal paths selected within FIG. 3 are highlighted by a bolder line weight. For example, based on the setting of CB[0] 316 to "0", the output of OUT_2 of core 310 is selected by multiplexor 314 of access port 312 as the output to IN_1 of core 330 and bidirectional I/O port 318 is set to output the output signal from multiplexor 314 to external access point 382, to enable debugging controller 380 to debug the external output signal from OUT_2 of core 310, which is also passed through an internal signal to IN_1 of core 330. For example, based on the setting of CB[1] 324 to "0", the output of OUT_1 of core 330 is selected by multiplexor 322 of access port 320 as the output to IN_2 of core 310 and bidirectional I/O port 326 is set to output the output signal from multiplexor 322 to external access point 388, to enable debugging controller 380 to debug the external output signal from OUT_1 of core 330, which is also passed through an internal signal to IN_2 of core 310. For example, based on the setting of CB[2] 336 to "0", the output of OUT_2 of core 330 is selected by multiplexor 334 of access port 332 as the output to IN_1 of core 350 and bidirectional I/O port 338 is set to output the output signal from multiplexor 334 to external access point 384, to enable debugging controller 380 to debug the external output signal from OUT_2 of core 330, which is also passed through an internal signal to IN_1 of core 350. For example, based on the setting of CB[3] 344 to "0", the output of OUT_1 of core 350 is selected by multiplexor 342 of access port 340 as the output to IN_2 of core 330 and bidirectional I/O port 346 is set to output the output signal from multiplexor 342 to external access point 390, to enable debugging controller 380 to debug the external output signal from OUT_1 of core 350, which is also passed through an internal signal to IN_2 of core 330. For example, based on the setting of CB[4] 356 to "0", the output of OUT_2 of core 350 is selected by multiplexor 354 of access port 352 as the output to IN_1 of core 370 and bidirectional I/O port 358 is set to output the output signal from multiplexor 354 to external access point 386, to enable debugging controller 380 to debug the external output signal from OUT_2 of core 350, which is also passed through an internal signal to IN_1 of core 370. For example, based on the setting of CB[5] 364 to "0", the output of OUT_1 of core 370 is selected by multiplexor 362 of access port 360 as the output to IN_2 of core 350 and bidirectional I/O port 366 is set to output the output signal from multiplexor 362 to external access point 392, to enable debugging controller 380 to debug the external output signal from OUT_1 of core 370, which is also passed through an internal signal to IN_2 of core 350.

Figure 4:
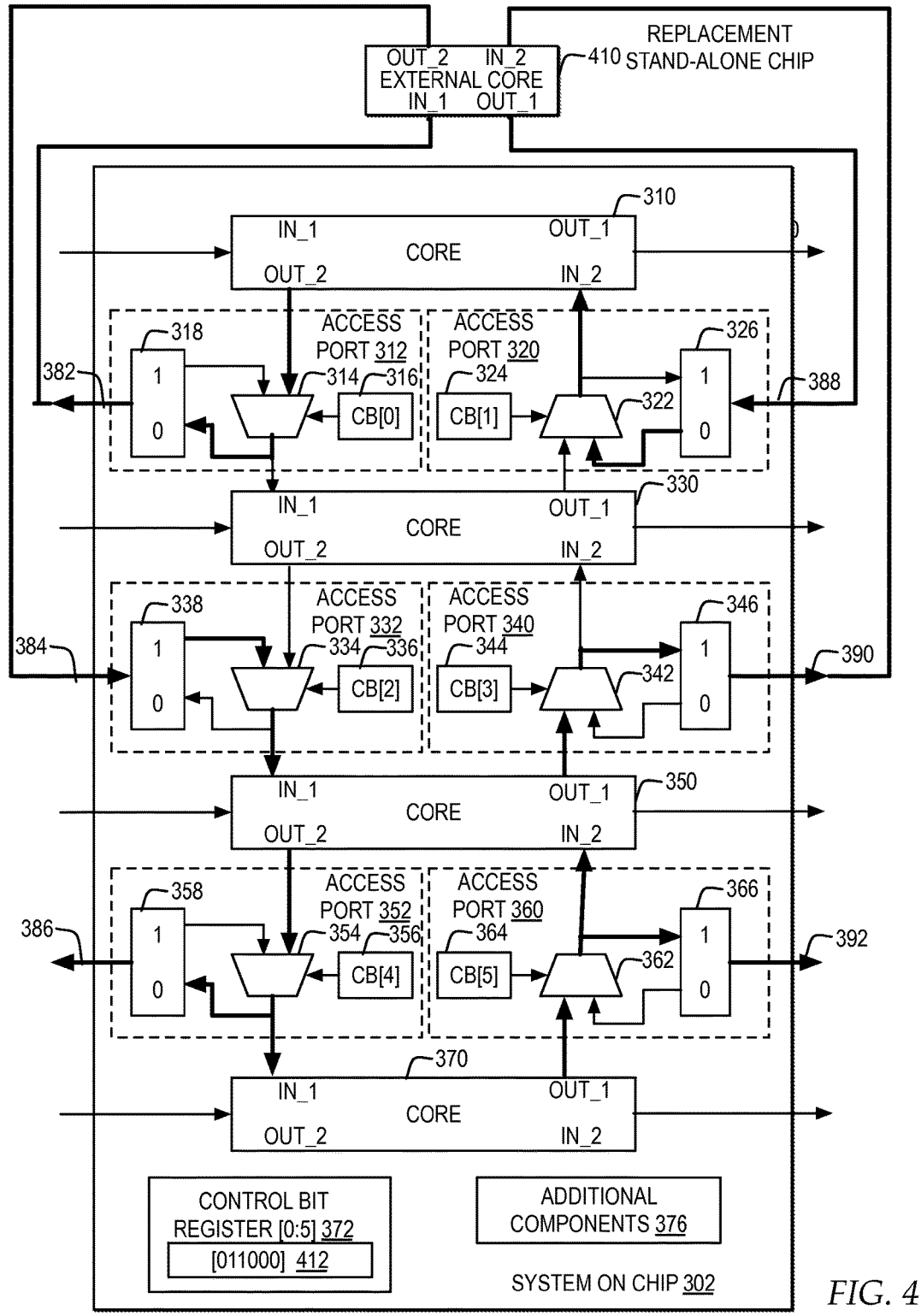
FIG. 4 illustrates one example of a block diagram of an SOC with access ports providing dynamic multi-purpose external access points that are dynamically set to enable replacement of an internal core of the SOC by an external core.

FIG. 4 illustrates one example of a block diagram of an SOC with access ports providing dynamic multi-purpose external access points that are dynamically set to enable replacement of an internal core of the SOC by an external core.

In one example, in FIG. 4, core 330, an internal core of SOC 302, is replaced by external core 410, a core that is external to SOC 302. In one example, external core 410 may be identified as external to SOC 302 because external core 410 is manufactured as a stand-alone, individual core not originally integrated into SOC 302. In another example, external core 410 may be identified as external to SOC 302 because external core 410 is attached to SOC 302 as an interchangeable component. In another example, SOC 302 may be attached to a board and external core 410 may also be attached to the same board, as stand-alone, individual cores, such as SOC 302 and external core 410 both being interchangeably attached to a same PCB.

In one example, in FIG. 4, to enable replacement of core 330 by external core 410, control bit register 372 is set to a current bit control setting "011000" as illustrated at reference numeral 412. In particular, in the example, the bit settings of bits [0], [1], [2], and [3] dynamically set SOC 302 to enable replacement of core 330.

In the example, based on the setting of CB[0] 316 to "0", the output of OUT_2 of core 310 is selected by multiplexor 314 of access port 312 as the output from multiplexor 314. Bidirectional I/O port 318 is set to output the output signal from multiplexor 314 through external access point 382, as an external output of the signal from OUT_2 of core 310. In the example, the external output of the signal from OUT_2 of core 310, through external access point 382, is connected to an input interface IN_1 of external core 410 to replace the connection from OUT_2 of core 310 to IN_1 of core 330.

In the example, based on the setting of CB[1] 324 to "1", bidirectional I/O port 326 is set as an input port and a signal output from OUT_1 of external core 410 is received as an input to bidirectional I/O port 326 via external access point 388. In the example, based on the setting of CB[1] 324 to "1", multiplexor 322 selects the signal from bidirectional I/O port 326 as the signal for output to IN_2 of core 310. In particular, in the example, the signal output from OUT_1 of external core 410 is connected to the input interface IN_2 of core 310, through external access point 388, to replace the connection from OUT_1 of core 330 to IN_2 of core 310.

In the example, based on the setting of CB[2] 336 to "1", bidirectional I/O port 338 is set as an input port and a signal output from OUT_2 of external core 410 is received as an input to bidirectional I/O port 338 via external access point 384. In the example, based on the setting of CB[2] 336 to "1", multiplexor 334 selects the signal from bidirectional I/O port 338 as the signal for output to IN_1 of core 350. In particular, in the example, the signal output from OUT_2 of external core 410 is connected to the input interface IN_1 of core 350, through external access point 384, to replace the connection from OUT_2 of core 330 to IN_1 of core 350.

In the example, based on the setting of CB[3] 344 to "0", the output of OUT_1 of core 350 is selected by multiplexor 342 of access port 340 as the output from multiplexor 342. Bidirectional I/O port 346 is set to output the output signal from multiplexor 342, as an external output of the signal from OUT_1 of core 350, via external access point 390. In the example, the external output of the signal from OUT_1 of core 350 is connected to an input interface IN_2 of external core 410 via external access point 390 to replace the connection from OUT_1 of core 350 to IN_2 of core 330.

In the example illustrated in FIG. 4, access port 312, access port 340, access port 352, and access port 360 are set to function as output ports, as described with reference to FIG. 3, and, as described with reference to FIG. 3, debugging controller 380 may be set to read the outputs from access port 312, access port 340, access port 352 and access port 360, for debugging the individual cores. In particular, in the example, access port 312 via external access point 382 and access port 340 via external access point 390 may be set as output ports for outputting signals connected to input interfaces of external core 410 and for outputting signals readable by debugging controller 380. In one example, after core 330 is replaced by external core 410, a debugging controller may read outputs from access port 312 via external access point 382, access port 340 via external access point 390, access port 352 via external access point 386, and access port 360 via external access point 392 and from interfaces of external core 410, to enable debugging of individual cores of SOC 302 when an external core replaces an internal core.

Figure 5:
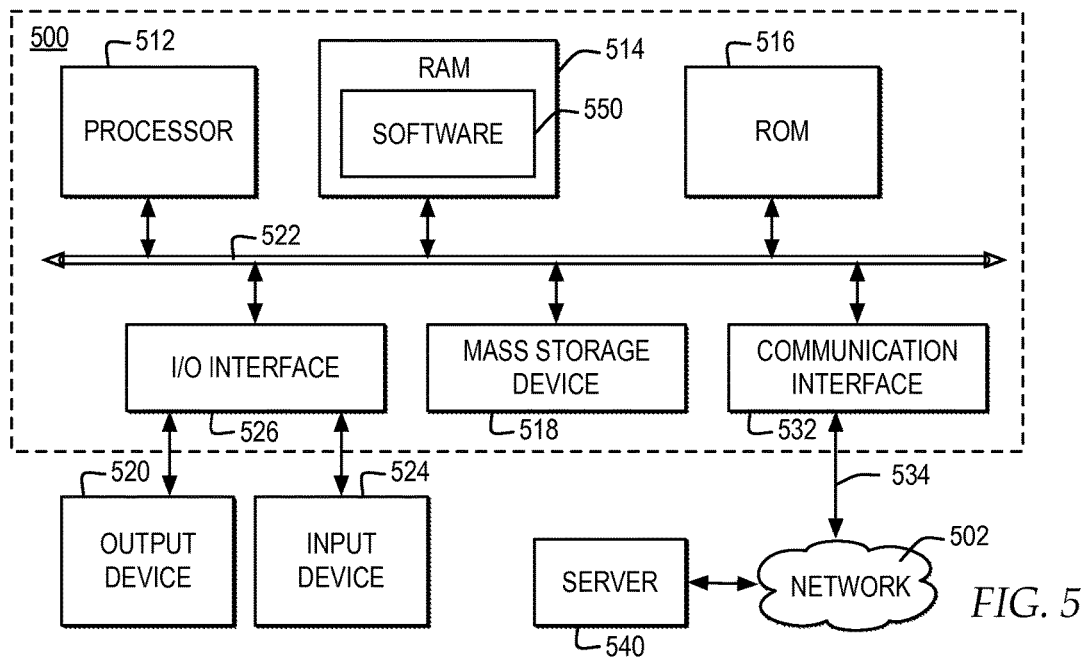
FIG. 5 illustrates one example of a block diagram of a computer system in which one embodiment of the invention may be implemented.

FIG. 5 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to a network, such as network 802.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. When implemented as a server or node, computer system 500 may include multiple processors designed to improve network servicing power.

Where multiple processors share bus 522, additional controllers (not depicted) for managing bus access and locks may be implemented. In addition, processor 512 may represent a SOC that includes multiple cores integrated into a single chip and computer system 500 may include a SOC, such as SOC 302, and may include additional external cores, such as external core 410. In addition, in one example, all or portions of computer system 500 may be integrated into a SOC.

Processor 512 may be at least one general-purpose processor that, during normal operation, processes data under the control of software 550, which may include at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. Software 550 may include, but is not limited to, code, applications, protocols, interfaces, and processes for controlling one or more systems within a network including, but not limited to, an adapter, a switch, a server, a cluster system, and a grid environment.

Computer system 500 may communicate with a remote computer, such as server 840, or a remote client. In one example, server 540 may be connected to computer system 800 through any type of network, such as network 502, through a communication interface, such as network interface 532, or over a network link that may be connected, for example, to network 502.

In the example, multiple systems within a network environment may be communicatively connected via network 502, which is the medium used to provide communications links between various devices and computer systems communicatively connected. Network 502 may include permanent connections such as wire or fiber optics cables and temporary connections made through telephone connections and wireless transmission connections, for example, and may include routers, switches, gateways and other hardware to enable a communication channel between the systems connected via network 502. Network 502 may represent one or more of packet-switching based networks, telephony based networks, broadcast television networks, local area and wire area networks, public networks, and restricted networks.

Network 502 and the systems communicatively connected to computer 500 via network 502 may implement one or more layers of one or more types of network protocol stacks which may include one or more of a physical layer, a link layer, a network layer, a transport layer, a presentation layer, and an application layer. For example, network 502 may implement one or more of the Transmission Control Protocol/Internet Protocol (TCP/IP) protocol stack or an Open Systems Interconnection (OSI) protocol stack. In addition, for example, network 502 may represent the worldwide collection of networks and gateways that use the TCP/IP suite of protocols to communicate with one another. Network 502 may implement a secure HTTP protocol layer or other security protocol for securing communications between systems.

In the example, network interface 532 includes an adapter 534 for connecting computer system 500 to network 502 through a link and for communicatively connecting computer system 500 to server 540 or other computing systems via network 502. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Figure 7:
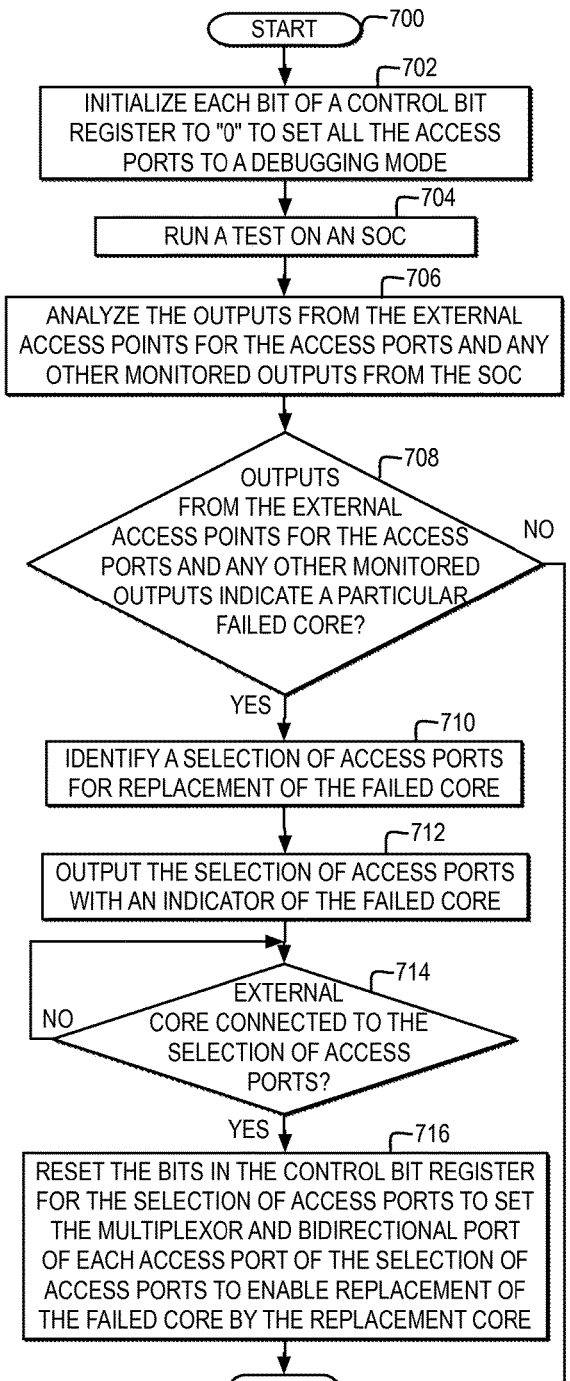
FIG. 7 illustrates one example of a high level logic flowchart of a process and program for individually debugging cores integrated within a SOC and enabling replacement of any failed cores.
Figure 8:
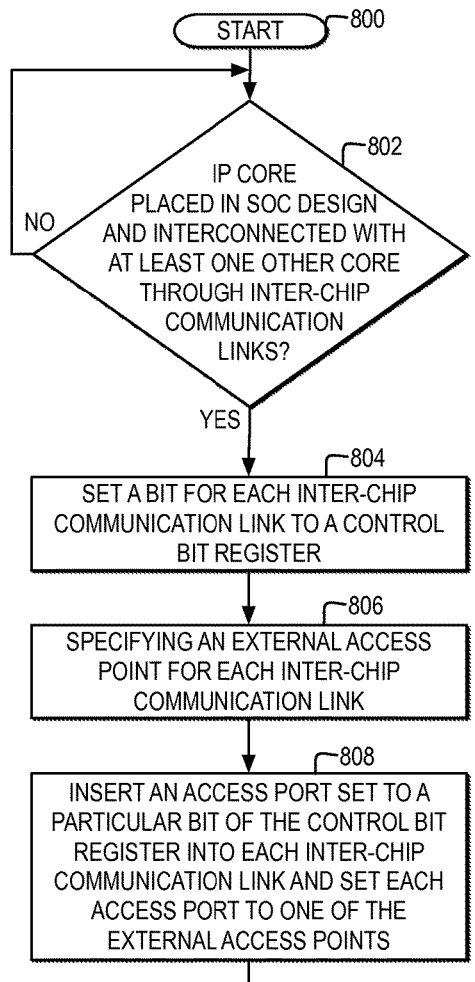
FIG. 8 illustrates one example of a high level logic flowchart of a process and program for integrating access points into inter-chip communication links between cores of an SOC to enable specifying of dynamic multi-purpose external access points connected to input/output (I/O) interfaces of cores connected within a SOC to provide for debugging cores and replacement of failed internal cores by one or more external cores.

In one embodiment, the operations performed by processor 512 may control the operations of flowchart of FIGS. 7 and 8 and other operations described herein. Operations performed by processor 512 may be requested by software 550 or other code or the steps of one embodiment of the invention might be performed by specific hardware components that contain hardwired logic for performing the steps, or by any combination of programmed computer components and custom hardware components. In one embodiment, one or more components of computer system 500, or other components, which may be integrated into one or more components of computer system 500, may contain hardwired logic for performing the operations of flowcharts in FIGS. 7 and 8.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 5, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
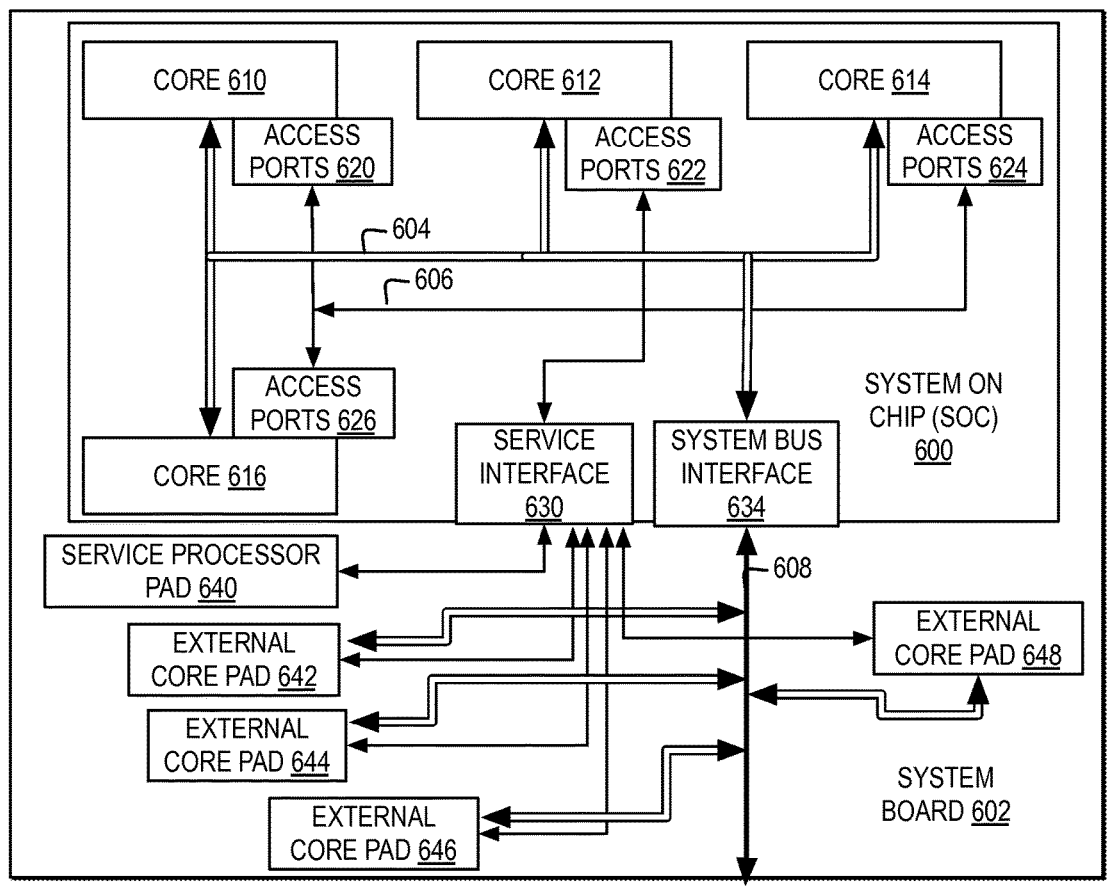
FIG. 6 illustrates one example of a block diagram of an integrated circuit that functions as a SOC attached to a board with interface pads specified for debugging and for external replacement cores.

FIG. 6 illustrates one example of a block diagram of an integrated circuit that functions as a SOC attached to a board with interface pads specified for debugging and for external replacement cores. In one example, computer system 500, and the blocks described in computer system 500, may be implemented using one or more integrated circuit devices. In one example, one or more of the blocks of computer system 500 may be implemented as integrated into a SOC, such as SOC 600. In one example, SOC 600 may implement a multiple core design. One of ordinary skill in the art will appreciate that the invention should not be limited to use within a particular design or end use of an integrated circuit. Integrated circuits may be designed and fabricated using one or more computer data files, which may also be referred to as hardware definition programs, which define the layout of the circuit arrangements on the devices. As previously described with reference to FIG. 1, IP core 104 and IP core 106 may represent designs for one or more cores that may be placed into the design of a SOC, to define the layout of the circuit arrangements for each core, and may be integrated into the hardware definition programs for SOCs. Hardware definition programs may be generated by a design tool and then used during manufacturing to create layout masks to define the circuit arrangements to be applied to a semiconductor wafer when fabricating a SOC.

In one example, SOC 600 includes multiple independent cores, integrated into SOC 600 as internal cores, illustrated as a core 610, a core 612, a core 614, and a core 616. In one example, a primary input and output interface of each core is connected within SOC 600 via a system bus 604, which connects to a system bus interface 634, where system bus interface 634 may include one or more pins for enabling an input and output interface to a main system bus that SOC 600 may be connected to, such as main system bus 608.

In one example, one or more access ports, as described herein, and for example, access port 312, access port 320, access port 332, access port 340, access port 352, and access port 360, may be integrated into a service bus 606 that provides inter-chip communication links between the additional input and output interfaces of each core. For example, access ports 620, access port 622, access ports 624, and access ports 626 may be integrated into service bus 606 and the additional input and output interfaces of each core. In one example, service bus 606 connects to a service interface 630, which may include one or more pins for enabling an input and output interface to one or more components that may read outputs from service bus 606 or output signals for input to service interface 630. In one example, service interface 630 may also include an interface for control bit register 372.

In one example, a system board 602 may be manufactured that incorporates SOC 600 and includes one or more pad interfaces for connecting one or more additional individual processor cores to system board 602 to optimize use of the functions available through service interface 630. In one example, system board 602 may also include a pad that enables SOC 600 to attach to system board 602 and to be interchangeable. In one example, system board 602 may include a PCB, as described with reference to FIG. 2.

In one example, system board 602 may include a service processor pad 640 for attaching a service processor, for performing debugging functions, such as a service processor enabled to function as debugging controller 380. In one example, system board 602 may include connections specified for connecting service processor pad 640 with service interface 630, for reading outputs from service interface 630 and may also include connections specified for connecting to main system bus 608.

In one example, system board may also include one or more external core pads for enabling external cores to be attached to system board 602 and to be interchangeable. In one example, each external core pad may include connections specified in system board 602 to service interface 630 and system bus interface 634 for enabling each external core pad to replace a particular internal core of SOC 600. For example, the connections specified in system board 602 for external core pad 642 may connect external core pad to a selection of pins of service interface 630 to enable an external core attached to external core pad 642 to replace core 610 in correlation with access port control bit register settings, the connections specified in system board 602 for external core pad 644 may connect external core pad to a selection of pins of service interface 630 to enable an external core attached to external core pad 644 to replace core 612 in correlation with access port control bit register settings, the connections specified in system board 602 for external core pad 646 may connect external core pad to a selection of pins of service interface 630 to enable an external core attached to external core pad 646 to replace core 614 in correlation with access port control bit register settings, and the connections specified in system board 602 for external core pad 648 may connect external core pad to a selection of pins of service interface 630 to enable an external core attached to external core pad 648 to replace core 616 in correlation with access port control bit register settings. In another example system board 602 may include additional or alternate external core pads designed for attaching external cores, which in correlation with access port control bit register settings, allow for replacement of an internal core of SOC 600 with an external core attached to the external core pad.

FIG. 7 illustrates a high level logic flowchart of a process and program for individually debugging cores integrated within a SOC and enabling replacement of any failed cores.

In one example, the process and program starts at block 700 and thereafter proceeds to block 702. Block 702 illustrates initializing each bit of a control register to "0" to set all the access ports to a debugging mode. Next, block 704 illustrates running a test on a SOC. Thereafter, block 706 illustrates analyzing the outputs from the external access points for the access ports and any other monitored outputs from the SOC. In one example, other monitored outputs may include the primary outputs from each core to a system bus. Next, block 708 illustrates a determination whether the outputs from the external access points for the access ports and any other monitored outputs indicate a particular failed core. At block 708, if the outputs from the external access points for the access ports and any other monitored outputs do not indicate a failed core, then the process ends. At block 708, if the outputs from the external access points for the access ports and any other monitored outputs indicate a particular failed core, then the process passes to block 710.

Block 710 illustrates identifying a selection of access ports for controlling replacement of the failed core. Block 712 illustrates outputting the selection of access ports with an indicator of the failed core. Next, block 714 illustrates a determination whether an external core is connected to the selection of access ports for replacing the failed core. At block 714, once an external core is connected to the selection of access ports for replacing the failed core, then the process passes to block 716. Block 716 illustrates resetting the bits in the control bit register for the selection of access ports to set the multiplexor and bidirectional port of the selection of access ports to enable replacement of the failed core by the replacement core, and the process ends.

FIG. 8 illustrates a high level logic flowchart of a process and program for integrating access points into inter-chip communication links between cores of an SOC to enable specifying of dynamic multi-purpose external access points connected to input/output (I/O) interfaces of cores connected within a SOC to provide for debugging cores and replacement of failed internal cores by one or more external cores.

In one example, the process and program starts at block 800 and thereafter proceeds to block 802. Block 802 illustrates a determination whether there is an IP core placed in an SOC design and interconnected with at least one other core through inter-chip communication links. At block 802, if there is an IP core placed in an SOC design and interconnected with at least one other core through inter-chip communication links, then the process passes to block 804. Block 804 illustrates setting a bit for each inter-chip communication link to a control bit register. Next, block 806 illustrates specifying an external access point for each inter-chip communication link. Thereafter, block 808 illustrates inserting an access port set to a particular bit of the control bit register into each inter-chip communication link and setting each access port to one of the external access points, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. An integrated circuit device, comprising:
   a plurality of cores disposed on an integrated circuit device, one or more of the plurality of cores comprising one or more separate input and output interfaces, each of the plurality of cores integrated within the integrated circuit device to function as a single computer system;
   one or more internal inter-chip connection links disposed on the integrated circuit device for connecting one or more of the plurality of cores with at least one other core of the plurality of cores via the one or more separate input and output interfaces; and
   one or more bidirectional access ports communicatively connected in each path of the one or more inter-chip connection links to enable a separate external access point from among a plurality of external access points to each of the one or more separate input and output interfaces of the one or more of the plurality of cores, wherein each of the one or more bidirectional access ports is dynamically selectable as each of an external input interface of the integrated circuit device and an external output interface of the integrated circuit device;
   wherein each of the one or more bidirectional access ports being operative to be dynamically set to operate as one of the external input interface and the external output interface based on a setting of a separate control register bit, from among a plurality of register bits, specified for each of the one or more bidirectional access ports.

2. The integrated circuit device according to claim 1, further comprising:
   the plurality of cores manufactured as internal cores of the integrated circuit device based on a separate core design block from among a plurality of core design blocks for each of the plurality of cores inserted into a design for the integrated circuit device, wherein the separate core design block from among the plurality of core design blocks is a design for an independently functional processor core.

3. The integrated circuit device according to claim 1, wherein the plurality of cores are not interchangeable.

4. The integrated circuit device according to claim 1, wherein the one or more internal inter-chip connection links are only visible for access by a component external to the integrated circuit device via the one or more bidirectional access ports connected to the plurality of external access points.

5. The integrated circuit device according to claim 1, wherein the one or more separate input and output interfaces of the one or more cores each provides a separate interface for operational signals of the one or more cores, wherein each of the plurality of cores separately comprises a primary input and output interface for data signals.

6. An integrated circuit device, comprising:
   a plurality of cores disposed on an integrated circuit device, one or more of the plurality of cores comprising one or more separate input and output interfaces, each of the plurality of cores integrated within the integrated circuit device to function as a single computer system;
   one or more internal inter-chip connection links disposed on the integrated circuit device for connecting one or more of the plurality of cores with at least one other core of the plurality of cores via the one or more separate input and output interfaces; and
   one or more bidirectional access ports communicatively connected in each path of the one or more inter-chip connection links to enable a separate external access point from among a plurality of external access points to each of the one or more separate input and output interfaces of the one or more of the plurality of cores, wherein each of the one or more bidirectional access ports is dynamically selectable as each of an external input interface of the integrated circuit device and an external output interface of the integrated circuit device,
   wherein each bidirectional access port of the one or more bidirectional access ports further comprises:
   a multiplexor operative to receive a first input and a second input and to output an internal output selected from among the first input and the second input based on a setting of a selector bit;
   the multiplexor operative to receive a first input from an output of a particular input and output interface of the one or more input and output interfaces;
   a bidirectional latch connected to a particular external access point from among the plurality of external access points of the integrated circuit device;
   the external access point operative to provide an external interface for connection to by a component external to the integrated circuit device;
   the bidirectional latch comprising a dynamically selectable latch configured as each of an input latch for receiving an external input from the external access point and outputting the external input to the second input of the multiplexor and an output latch for outputting the internal output of the multiplexor to the external access point;
   the multiplexor operative to output the internal output to another input and output interface of the one or more input and output interfaces of the one or more cores and to output the internal output to the bidirectional latch.

7. The integrated circuit device according to claim 1, further comprising:
   the one or more bidirectional access ports dynamically selectable to operate as the external output interface, wherein a debugging controller communicatively connected to the plurality of external access points reads signals output from the separate input and output interfaces of the plurality of cores through the plurality of external access points for enabling the debugging controller to individually debug each of the plurality of cores.

8. The integrated circuit device according to claim 1, further comprising:
a first selection of the one or more bidirectional access ports dynamically selectable to operate as the external input interface and a second selection of the one or more bidirectional access ports dynamically selectable to operate as the external output interface, wherein at least one output to enable replacement of one of the plurality of cores by an external core connected through a selection of the plurality of external access points connected to the first selection of the one or more bidirectional access ports and the second selection of the one or more bidirectional access ports.

9. A method for designing a system on chip, comprising:
in response to detecting an IP block placed in a design for a system on chip and an input and output interface of the IP block inter-connected with at least one other input and output interface of another IP block through an inter-chip communication link, setting a particular bit for the inter-chip communication link in a control bit register comprising a plurality of bits;
specifying an external access point for the inter-chip communication link in the design;
inserting a bidirectional access port selectable according to the particular bit of the control bit register into the inter-chip communication link in the design, wherein the bidirectional access port is dynamically selectable as each of an input interface and an output interface by according to the setting in the particular bit; and
setting the access port to the external access point for an external access to the IP block within the design for the system on chip for providing an external access to the input and output interface of a core manufactured in the system on chip for the IP block in the design.

10. The method according to claim 9, further comprising:
inserting the bidirectional access port further comprising a multiplexor operative to receive a first input and a second input and to output an internal output selected from among the first input and the second input based on a setting of the particular bit, the multiplexor operative to receive a first input from an output of the input and output interface of the IP block; and
inserting the bidirectional access port further comprising a bidirectional latch connected to the external access point, the external access point operative to provide an external interface for connection to by a component external to the integrated circuit device, the bidirectional latch comprising a dynamically selectable latch configured as each of an input latch for receiving an external input from the external access point and outputting the external input to the second input of the multiplexor and an output latch for outputting the internal output of the multiplexor to the external access point, and the multiplexor operative to output the internal output to the at least one other input and output interface and to output the internal output to the bidirectional latch.

11. A method for testing each individual core of a plurality of cores integrated into an integrated circuit device, comprising:

setting, by a debugging controller, a plurality of bidirectional access ports within an integrated circuit device, each of the plurality of bidirectional access ports connected to a separate external access point of a plurality of external access points of the integrated circuit device, to enable each of the plurality of bidirectional access ports to operate as an external output port for outputting a separate signal from a separate output interface of one of a plurality of cores integrated within the integrated circuit device onto a separate external access point of the plurality of external access points;
running, by a debugging controller, a test sequence on the integrated circuit device;
analyzing, by the debugging controller the outputs read from the plurality of external access points to determine whether each core of the plurality of cores is functional; and
in response to detecting from the outputs read from the plurality of external access points that a particular core of the plurality of cores has failed, selecting, by the debugging controller, a first selection of the plurality of bidirectional access ports to set to operate as an external input port for receiving signals from an output interface of an external core and selecting a second selection of the plurality of bidirectional access ports to set to operate as an external output port for signals output from at least one of the plurality of cores to enable replacement of the particular core within the integrated circuit device by the external core.

12. The method according to claim 11, wherein setting, by a debugging controller, a plurality of bidirectional access ports within an integrated circuit device, each of the plurality of bidirectional access ports connected to a separate external access point of a plurality of external access points of the integrated circuit device, to enable each of the plurality of bidirectional access ports to operate as an external output port for outputting a separate signal from a separate output interface of one of a plurality of cores integrated within the integrated circuit device onto a separate external access point of the plurality of external access points, further comprises:
setting, by the debugging controller, the plurality of bidirectional access ports within the integrated circuit device, wherein the integrated circuit device comprises plurality of cores manufactured as internal cores of the integrated circuit device based on a separate core design block from among a plurality of core design blocks for each of the plurality of cores inserted into a design for the integrated circuit device, wherein the separate core design block from among the plurality of core design blocks is a design for an independently functional processor core.

13. The method according to claim 11, wherein in response to detecting from the outputs read from the plurality of external access points that a particular core of the plurality of cores has failed, selecting, by the debugging controller, a first selection of the plurality of bidirectional access ports to set to operate as an external input port for receiving signals from an output interface of an external core and selecting a second selection of the plurality of bidirectional access ports to set to operate as an external output port for signals output from at least one of the plurality of cores to enable replacement of the particular core within the integrated circuit device by the external core, further comprises:
selecting, by the debugging controller, the first selection of the plurality of bidirectional access ports to set to operate as the external input port for receiving signals from the output interface of the external core and selecting the second selection of the plurality of bidirectional access ports to set to operate as the external output port for signals output from the at least one of the plurality of cores to enable replacement of the particular core within the integrated circuit device by the external core, wherein the plurality of cores are replaceable by the external core but not interchangeable within the integrated circuit device.

14. The method according to claim 11, wherein setting, by a debugging controller, a plurality of bidirectional access ports within an integrated circuit device, each of the plurality of bidirectional access ports connected to a separate external access point of a plurality of external access points of the integrated circuit device, to enable each of the plurality of bidirectional access ports to operate as an external output port for outputting a separate signal from a separate output interface of one of a plurality of cores integrated within the integrated circuit device onto a separate external access point of the plurality of external access points, further comprises:

setting, by the debugging controller, the plurality of bidirectional access ports within the integrated circuit device, wherein the separate output interface of one or more of the plurality of cores is connected to a separate input interface of another one or more of the plurality of cores via one or more internal inter-chip connection links, wherein the signal on each separate output interfaces is only visible for access by a component external to the integrated circuit device via one of the plurality of bidirectional access ports connected to one of the plurality of external access points.

15. The method according to claim 11, wherein setting, by a debugging controller, a plurality of bidirectional access ports within an integrated circuit device, each of the plurality of bidirectional access ports connected to a separate external access point of a plurality of external access points of the integrated circuit device, to enable each of the plurality of bidirectional access ports to operate as an external output port for outputting a separate signal from a separate output interface of one of a plurality of cores integrated within the integrated circuit device onto a separate external access point of the plurality of external access points, further comprises:

setting, by the debugging controller, the plurality of bidirectional access ports within the integrated circuit device, wherein each of the plurality of bidirectional access ports comprises:

receiving, by a multiplexor, a first input and a second input;

outputting, by the multiplexor, an internal output selected from among the first input and the second input based on a setting of a selector bit;

receiving, by the multiplexor, a first input from an output of the separate output interface;

connecting, by a bidirectional latch, to the separate external access point;

providing, by the external access point, an external interface for connection to by a component external to the integrated circuit device;

operating, by the bidirectional latch, as one of an input latch for receiving an external input from the separate external access point and outputting the external input to the second input of the multiplexor and an output latch for outputting the internal output of the multiplexor to the separate external access point; and outputting, by the multiplexor, the internal output to a separate input interface of another core of the plurality of cores and to output the internal output to the bidirectional latch.

16. The method according to claim 11, wherein setting by a debugging controller, a plurality of bidirectional access ports within an integrated circuit device, each of the plurality of bidirectional access ports connected to a separate external access point of a plurality of external access points of the integrated circuit device, to enable each of the plurality of bidirectional access ports to operate as an external output port for outputting a separate signal from a separate output interface of one of a plurality of cores integrated within the integrated circuit device onto a separate external access point of the plurality of external access points, further comprises:

setting, by the debugging controller, the plurality of bidirectional access ports within the integrated circuit device, wherein each of the one or more bidirectional access ports is dynamically selectable as each of the external input port and the external output port based on a setting of a separate control register bit, from among a plurality of register bits, specified for each of the one or more bidirectional access ports.

\* \* \* \* \*